US012688055B2

(12) United States Patent
Bhatia

(10) Patent No.: US 12,688,055 B2
(45) Date of Patent: Jul. 21, 2026

(54) INPUT/OUTPUT PROCESSING OF CONTAINER APPLICATION DATA BY MODULE ADDITION

(71) Applicant: VMware LLC, Palo Alto, CA (US)

(72) Inventor: Kashish Bhatia, Bangalore (IN)

(73) Assignee: VMware LLC, Palo Alto, CA (US)

( * ) Notice: Subject to any disclaimer, the term of this patent is extended or adjusted under 35 U.S.C. 154(b) by 569 days.

(21) Appl. No.: 18/133,920

(22) Filed: Apr. 12, 2023

(65) Prior Publication Data

US 2024/0345858 A1     Oct. 17, 2024

(51) Int. Cl.
*G06F 9/455* (2018.01)
(52) U.S. Cl.
CPC .. *G06F 9/45558* (2013.01); *G06F 2009/4557* (2013.01); *G06F 2009/45579* (2013.01)
(58) Field of Classification Search
None
See application file for complete search history.

(56) References Cited

U.S. PATENT DOCUMENTS

| | | | |
|---|---|---|---|
| 10,721,290 B2 | 7/2020 | Gill et al. | |
| 11,061,603 B1 * | 7/2021 | Bankar | G06F 3/0614 |
| 2015/0212845 A1 * | 7/2015 | Tsirkin | G06F 9/45558 |
| | | | 711/114 |
| 2018/0300065 A1 * | 10/2018 | Talwar | G06F 12/0868 |
| 2021/0034791 A1 * | 2/2021 | Singh | G06F 21/79 |

| | | | |
|---|---|---|---|
| 2022/0092024 A1 | 3/2022 | Kavaipatti Anantharamakrishnan et al. | |
| 2022/0222011 A1 * | 7/2022 | Choi | G06F 3/0656 |
| 2023/0012930 A1 | 1/2023 | Gill et al. | |
| 2023/0126664 A1 * | 4/2023 | Bono | G06F 9/45558 |
| | | | 709/203 |

OTHER PUBLICATIONS

Extended European Search Report, European Application No. 24167507.3 dated Sep. 16, 2024, 10 pages.

* cited by examiner

*Primary Examiner* — Wynuel S Aquino
(74) *Attorney, Agent, or Firm* — King Intellectual Asset Management

(57) ABSTRACT

Disclosed embodiments pertain to support input/output modules for container volumes. An input/output (I/O) request can be received from a containerized application. A container volume targeted by the I/O request can be identified. A determination is then made that the container volume is associated with one or more I/O modules based on a stored mapping of container volumes to I/O modules. Data associated with the I/O request is sent to the one or more I/O modules for processing. Processed data can be received from the one or more I/O modules, and the I/O request is fulfilled using the processed data. In certain embodiments, a write I/O request is fulfilled by writing the processed data to a virtual disk file for the container volume, and a read I/O request is fulfilled by returning the original data after reversing the processing to the containerized application.

20 Claims, 10 Drawing Sheets

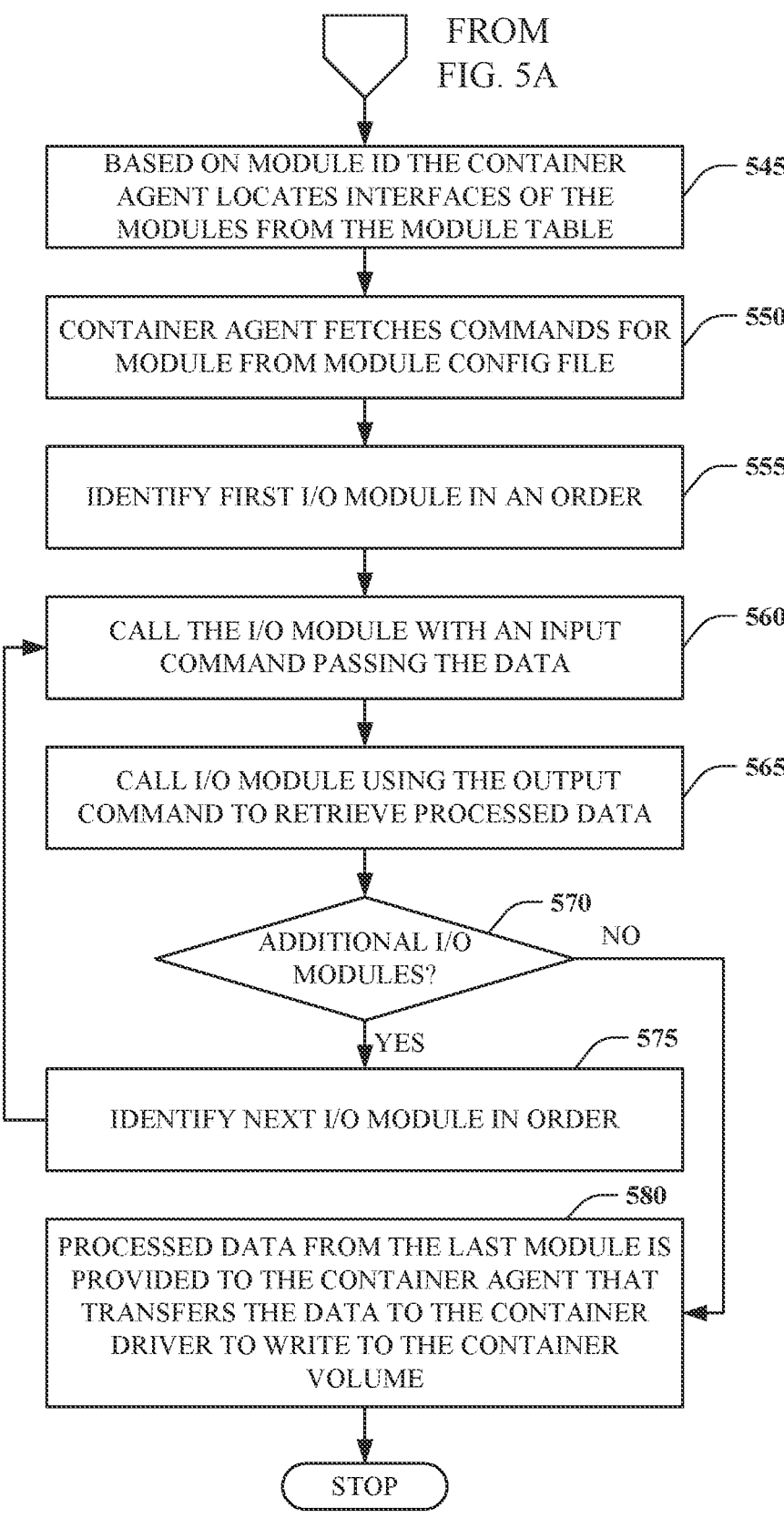

FROM
FIG. 5A

BASED ON MODULE ID THE CONTAINER AGENT LOCATES INTERFACES OF THE MODULES FROM THE MODULE TABLE — 545

CONTAINER AGENT FETCHES COMMANDS FOR MODULE FROM MODULE CONFIG FILE — 550

IDENTIFY FIRST I/O MODULE IN AN ORDER — 555

CALL THE I/O MODULE WITH AN INPUT COMMAND PASSING THE DATA — 560

CALL I/O MODULE USING THE OUTPUT COMMAND TO RETRIEVE PROCESSED DATA — 565

ADDITIONAL I/O MODULES? — 570    NO

YES

IDENTIFY NEXT I/O MODULE IN ORDER — 575

PROCESSED DATA FROM THE LAST MODULE IS PROVIDED TO THE CONTAINER AGENT THAT TRANSFERS THE DATA TO THE CONTAINER DRIVER TO WRITE TO THE CONTAINER VOLUME — 580

STOP

FIG. 5B

INPUT/OUTPUT PROCESSING OF CONTAINER APPLICATION DATA BY MODULE ADDITION

BACKGROUND

Virtualization is a process whereby software is used to create an abstraction layer over computer hardware that allows the hardware elements of a single computer to be divided into multiple virtual computers. The software used is called a hypervisor-a small layer that enables multiple operating systems (OSs) to run alongside each other, sharing the same physical computing resources. When a hypervisor is used on a physical server (also known as a bare metal server or a host) in a data center, the hypervisor allows the physical computer to separate its OS and applications from its hardware, thereby enabling the creation and management of virtual machines (VMs). The result is that each VM contains a guest OS, virtualized hardware that the OS requires to run, and one or more application(s) and their associated libraries and dependencies. Other virtual computing instances (VCIs) may also be used similarly to VMs.

While virtualization enables running multiple OSs on the hardware of a single physical server, containerization, on the other hand, enables deploying multiple applications using the same OS on a single VM or server. In particular, containerization is the packaging of software code with solely OS libraries and dependencies required to run the code to create a single lightweight executable, namely a container that runs consistently on any infrastructure. Containers simplify distributed application delivery and have become increasingly popular as organizations shift to cloud-native development and hybrid multi-cloud environments.

Kubernetes® (K8S®) software is an example open-source container orchestration platform that enables developers to package applications into containers. Developers may create containers without Kubernetes, as well, or use other containerization platforms. Kubernetes is essentially a toolkit that automates much of the operational effort required to run containerized applications. This operational effort includes a wide range of things needed to manage a container's lifecycle, including, but not limited to, provisioning, deployment, scaling (up and down), networking, and load balancing.

Containers were initially designed to be stateless. A stateless container is simple to deploy since the state of previous tasks is unsaved. After widespread use, stateful containers were developed, for example, to support stateful applications that predate containers. A stateful container is a container that includes an application (e.g., containerized application) that relies on state or data being maintained across multiple instances or deployments. In other words, a stateful container is an application container that keeps track of its data and maintains the data even when a container is restarted or moved to a different host.

Accordingly, a stateful container may store data in persistent storage. Persistent storage is non-volatile, meaning data remains intact even when the power is turned off. The persistent storage used by a stateful container is often called a container volume. A container volume may be a virtual disk (also referred to herein as a "storage virtual disk" or "persistent volume") that is an abstraction of a physical storage disk that the container accesses using I/Os as though it was a physical disk. In particular, a virtual disk file is created for each virtual disk, the virtual disk file being stored in physical storage and storing the data corresponding to the virtual disk. I/O accesses made by the container to the virtual disk are translated by the hypervisor to corresponding accesses to the virtual disk file. The purpose of a container volume is to exist independently from its container; therefore, when the container is removed, the container volume, and corresponding virtual disk file, is not automatically removed. The virtual disk files may remain in storage attached to (e.g., directly or via a network) (or located on) a host on which the stateful container runs in a VM.

SUMMARY

The following presents a simplified summary to provide a basic understanding of some aspects of the disclosed subject matter. This summary is not an extensive overview. It is not intended to identify necessary elements or delineate the scope of the claimed subject matter. Rather, this summary presents some concepts in a simplified form as a prelude to the more detailed description presented later.

According to one aspect, disclosed embodiments can include a method comprising receiving an input/output (I/O) request from a containerized application, identifying a container volume targeted by the I/O request, determining that the container volume is associated with one or more I/O modules based on a stored mapping of container volumes to I/O modules, sending data associated with the I/O request to the one or more I/O modules for processing, receiving processed data from the one or more I/O modules, and fulfilling the I/O request using the processed data. Further, fulfilling the I/O request using the processed data can comprise writing the processed data to a virtual disk for the container volume when the I/O request is a write I/O request, or returning the processed data to the containerized application when the I/O request is a read I/O request. Determining that the container volume is associated with one or more I/O modules can comprise determining the container volume is associated with two or more I/O modules and a specified order of the two or more I/O modules from the stored mapping. Additionally, sending the data associated with the I/O request to the one or more I/O modules for processing can comprise sending the data associated with the I/O request to the two or more I/O modules for processing in the specified order. The method can further comprise intercepting the I/O request by a container agent in a virtual machine and communicating the I/O request to a container driver in a hypervisor. Further, the method can comprise sending an uplink call to the container agent including the one or more I/O modules, in response to determining that the container volume is associated with the one or more I/O modules based on a stored mapping of container volumes to I/O modules by the container driver. The method can further comprise sending the I/O request without data to two or more I/O modules for processing in a first order, wherein the processing updates a header of the I/O request to direct the I/O request to a block address based on processing logic of the two or more I/O modules and retrieving the data from the block address In certain aspects, sending the data associated with the I/O request to the one or more I/O modules for processing comprises sending the data to the two or more I/O modules for processing in a second order, wherein the second order is the first order reversed. The I/O modules can perform various processes including one or more of encryption, compression, or formatting.

According to one aspect, disclosed embodiments can include a system that comprises one or more processors coupled to at least one memory. The at least one memory includes instructions that, when executed by the one or more processors, cause the one or more processors to identify a container volume targeted by a received input/output (I/O) request from a containerized application, determine that the container volume is associated with one or more I/O modules based on a stored mapping of container volumes to I/O modules, send data associated with the I/O request to the one or more I/O modules for processing, and fulfill the I/O request using processed data received from the one or more I/O modules. The instructions can further cause the one or more processors to write the processed data to a virtual disk file for the container volume to fulfill the I/O request when the I/O request is a read I/O request. Further, the instructions cause the one or more processors to return the processed data to the containerized application to fulfill the I/O request when the I/O request is a read I/O request. The instructions that cause the one or more processors to determine that the container volume is associated with one or more I/O modules can cause the one or more processors to determine the container volume is associated with two or more I/O modules and an order of the two or more I/O modules from the stored mapping. Additionally, the instructions that cause the one or more processors to send the data associated with the I/O request to the one or more modules for processing can cause the one or more processors to send the data associated with the I/O request to the two or more I/O modules for processing in the order. The instructions can further cause the one or more processors to intercept the I/O request by a container agent in a virtual machine and communicate the I/O request to a container driver in a hypervisor. Furthermore, the instructions can cause the one or more processors to determine the one or more I/O modules from a mapping of container volumes to I/O modules by the container driver and send an uplink call to the container agent including the one or more I/O modules.

According to yet another aspect, disclosed embodiments can include a non-transitory computer-readable medium comprising instructions that, when executed by one or more processors of a computing system, cause the computing system to perform operations. The operations can comprise identifying a container volume targeted by a received input/output (I/O) request from a containerized application, determining that the container volume is associated with one or more I/O modules based on a stored mapping of container volumes to I/O modules, sending data associated with the I/O request to the one or more I/O modules for processing, and fulfilling the I/O request using processed data received from the one or more I/O modules. In certain aspects, fulfilling the I/O request using the processed data received from the one or more I/O modules can comprise one of fulfilling a write I/O request by writing the processed data to a virtual disk file for the container volume or fulfilling a read I/O request by returning the processed data to the containerized application.

To accomplish the foregoing and related ends, certain illustrative aspects of the claimed subject matter are described herein in connection with the following description and annexed drawings. These aspects indicate various ways the subject matter may be practiced, all of which are intended to be within the scope of the disclosed subject matter. Other advantages and novel features may become apparent from the following detailed description when considered in conjunction with the drawings.

BRIEF DESCRIPTION OF THE DRAWINGS

FIGS. 5A-B depict a flow chart diagram of an example write I/O method.

DETAILED DESCRIPTION

Figure 1:
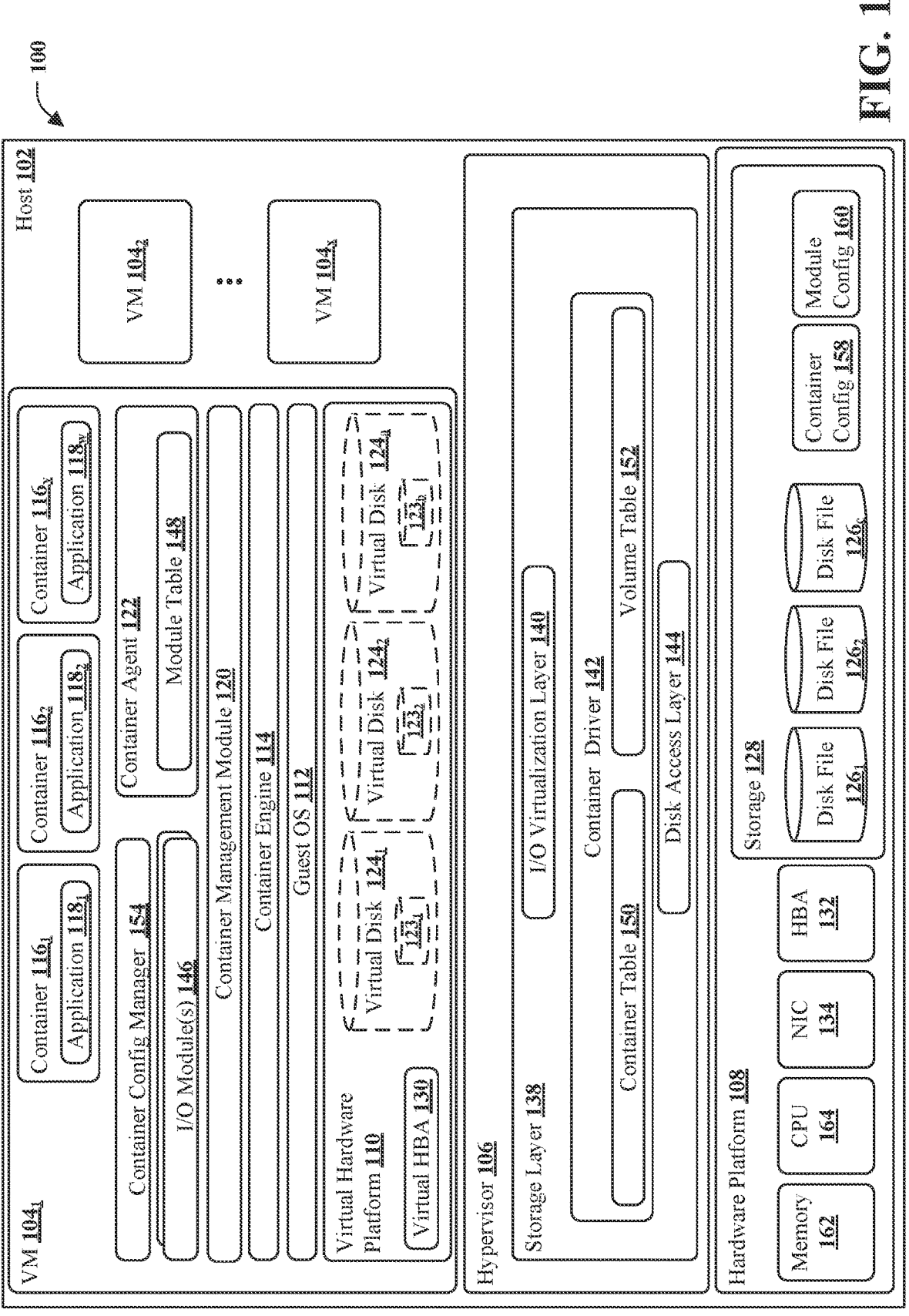
FIG. 1 depicts a computing system in which embodiments described herein may be implemented.

An increase in the use of stateful containers has fueled demand for additional functionality related to data storage in container volumes, such as storing data in container volumes in a particular format. Additional processing associated with data stored in container volumes can include encryption, compression, and format/layout conversion, among other things. For example, if an application deals with proprietary, personal, or other sensitive or confidential data, encryption of this data stored in a container volume may be desired if not required. For such advanced features, applications can rely on backend storage, such as a cloud storage provider, to deliver these services by managing the processing of data stored in container volumes hosted by the cloud storage provider.

However, there is a problem with utilizing cloud storage provider services. Suppose proprietary, sensitive, or confidential data is involved. In that case, this data is exposed to the cloud storage provider, which poses a security risk. Relying on a cloud provider or other third party to process data and store the data in a different form can enable the third party to gain insights into the data improperly.

Disclosed embodiments pertain to supporting input/output processing for container volumes. In certain embodiments, a platform enables developers to insert additional logic or I/O functionality over container volumes, such as in a plug-and-play fashion. The platform allows developers to implement or acquire one or more I/O modules, including processing logic or functionality for container volume interactions. I/O modules may also be called I/O processes, as they may be processes running on a computing device. In certain embodiments, the I/O modules can also be used in conjunction with one another (also referred to as "stackable") to enable arbitrarily complex processing. For example, formatting can be performed, followed by compression and then encryption. One or more I/O modules can be loaded within a virtual machine and associated with a container and corresponding container volume.

In certain embodiments, a container driver and agent support the I/O modules. The container driver can run as part of a hypervisor, and the container agent can run in a VM provided by the hypervisor. For example, when an application running in a container on the VM issues an I/O request (e.g., a read or write request) to a container volume, the container agent can intercept the I/O request. The I/O request issued by the application may contain an identifier (e.g., a universally unique identifier (UUID)) of the container volume. The container agent can enable communication between the VM and the hypervisor and allow VMs to communicate I/O requests to the hypervisor on behalf of containers. Accordingly, the container agent forwards the I/O request to the hypervisor such that the hypervisor can service the I/O request. In certain embodiments, the container agent determines a container identifier associated with the I/O request based on which container the I/O request originated from and further provides this information to the hypervisor, such as added to the I/O request.

In certain embodiments, the container driver running in the hypervisor determines a container identifier, a container volume identifier, or both associated with the I/O request. In certain aspects, the container driver can utilize the container volume identifier to determine one or more I/O modules associated with the container volume. In an example, one or more data structures (e.g., tables) may map the container volume identifier to one or more I/O module identifiers of one or more I/O modules. Therefore, the container driver can use the one or more data structures to determine which one or more I/O modules are associated with a container volume, based on a mapping between their respective identifiers. A specific implementation of the one or more data structures is further discussed herein, but it should be understood that the techniques herein may use any other suitable one or more I/O modules for the mapping.

In certain aspects, a first table (referred to as a container table) may include entries that map container identifiers to container volume identifiers, and further map the combination of container identifier and container volume identifier to a number of I/O modules associated with the container volume identified by the container volume identifier. Accordingly, in certain aspects, the container driver uses the first table to determine if there is an entry that maps the container identifier to the container volume identifier of the I/O request. If there is such an entry, it indicates that the container identified by the container identifier is associated with the container volume identified by the container volume identifier, and therefore allowed to make an I/O request to the container volume. The determined entry further includes a value indicating a number of I/O modules associated with a container volume. A non-zero number can indicate that one or more I/O modules are associated with the container volume. Accordingly, the container driver, in certain aspects, uses a second table that maps container volume identifiers to I/O module identifiers to determine one or more I/O modules associated with the container volume and, in some cases, the order of execution of the one or more I/O modules. For example, the container driver can look up the I/O module identifiers and, in some cases, the order in the second table (referred to as a volume table).

In certain embodiments, the container volume identifier can be used to determine whether one or more I/O modules are associated with the container volume to which the I/O request is issued, such as based on the volume table alone. For example, in certain embodiments, the container driver uses the container volume identifier to look for an entry in one or more tables, such as a volume table, that associates the container volume with one or more I/O module identifiers of one or more I/O modules.

If the container driver determines there are one or more I/O modules associated with the container volume, in certain embodiments, the container driver provides the one or more I/O module identifiers of the one or more I/O modules (and optionally an order in which to use the I/O modules to process data also indicated in the one or more tables) to the container agent, such as with an uplink call from hypervisor to the VM. Based on the one or more I/O module identifiers, the container agent locates one or more interfaces for the one or more I/O modules. For instance, the container agent can utilize an I/O module identifier as a key to look up an interface in one or more tables. An interface can correspond to a message queue associated with an I/O module to enable communication with the I/O module through particular commands. In certain embodiments, load, input, and output commands exist for an I/O module that, when invoked, load an I/O module into memory, receive input data for processing, and output processed data.

In certain embodiments, the container agent calls the one or more I/O modules using the identified one or more interfaces to process data associated with the I/O request. For a write request, the data may be identified by the I/O request (e.g., pointer to a location where the data is stored, such as in memory or a cache) or within the I/O request itself (e.g., within a data structure (e.g., string, array)). For example, the write request can indicate (e.g., using a block address, such as a logical block address (LBA)) one or more blocks to write the data to in the container volume and the data itself. For a read request, the data can be retrieved from the container volume indicated by the I/O request. For example, the read request may indicate (e.g., using a block address, such as an LBA) one or more blocks of the container volume from which to read the data. In certain aspects, the LBA used by a container is a block address in a virtual or logical address space of the container. The LBA may be translated to a physical block address (PBA) of the VM and/or physical storage to complete the I/O to the block in the container volume corresponding to the PBA.

In certain embodiments, where there is a specified order to the I/O modules, the container agent calls the I/O modules in the specified order to process the data. In certain aspects, there is a first order for write requests and a second order for read requests. In certain aspects, the second order is the reverse of the first order. For example, where the first order is I/O modules "A, B, C," the second order can be I/O modules "C, B, A."

In certain embodiments, for a write request, after one or more I/O modules process the data, the processed data is returned to the container agent, which provides the processed data to the hypervisor for the hypervisor to cause the processed data to be stored in the container volume. In certain embodiments, for a read request, after the one or more I/O modules process the data, the processed data is returned to the container agent, which provides the processed data to the application in the container. Accordingly, in some cases, arbitrary input/output functionality, such as processing, can be performed by one or more I/O modules within a virtual machine without the potential security risk posed by a storage service.

Though certain aspects are described with respect to a container running on a VM sharing a guest OS of the VM, it should be noted that the techniques described herein may also apply to a container running on a physical machine and not within a VM, such as sharing an OS of the physical machine. For example, the OS of the physical machine may handle functions described as handled by components of the hypervisor.

Various aspects of the subject disclosure are now described in more detail with reference to the annexed drawings, wherein like numerals generally refer to like or corresponding elements throughout. It should be understood, however, that the drawings and detailed description relating thereto are not intended to limit the claimed subject matter to the particular form disclosed. Instead, the intention is to cover all modifications, equivalents, and alternatives falling within the spirit and scope of the claimed subject matter.

FIG. 1 is a block diagram that illustrates a computing system 100 in which aspects described herein can be implemented. Computing system 100 includes one or more hosts 102 configured to provide a virtualization layer, also referred to as a hypervisor 106, which abstracts processor, memory, storage, and networking resources of hardware platform 108 into multiple virtual machines (VMs). Computing system 100 depicts VMs 104₁ to 104ₓ (collectively referred to as VMs 104 and individually referred to as VM 104) that run concurrently on the same host 102.

Each VM 104 implements a virtual hardware platform 110 that supports the installation of a guest OS 112 capable of executing one or more applications. Guest OS 112 may be a standard, commodity operating system. Examples of guest OS 112 include Microsoft Windows, Linux, and the like.

In certain embodiments, each VM 104 further includes a container engine 114 installed therein and running as a guest application under the control of guest OS 112. Container engine 114 is a process that enables the deployment and management of virtual instances (referred to interchangeably herein as "containers") by providing a layer of operating-system-level virtualization on guest OS 112 within VM 104. Containers 1161 to 116Y (collectively referred to as containers 116 and individually referred to as container 116) are software instances that enable virtualization at the operating system level. With containerization, the kernel of guest OS 112 is configured to provide multiple isolated user-space instances, referred to as containers. Containers 116 appear as unique servers from the standpoint of an end user that communicates with each of containers 116. However, from the standpoint of the guest OS 112 on which the containers 116 execute, the containers 116 are user processes scheduled and dispatched by the operating system.

Containers 116 encapsulate an application, such as applications 118₁ to 118ᵥᵥ (collectively referred to as applications 118 and individually referred to as application 118), as a single executable software package that bundles application code with all the related configuration files, libraries, and dependencies required to run. Application 118 may be any software program, such as a word processing program. Bins/libraries and other runtime components are developed or executed separately for each container 116.

In certain embodiments, each VM 104 further includes a container management module 120 and a container agent 122. Container management module 120 generally manages each container 116's lifecycle, including, but not limited to, the creation, use, and deletion of containers 116 running on container engine 114. In certain embodiments, container management module 120 creates containers 116 based on one or more configuration files that define parameters (e.g., port mappings, storage) for the containers 116 that are to be deployed on container engine 114.

Container agent 122 enables communication between VM 104 and hypervisor 106. In particular, container agent 122 is a tool that allows VM 104 to communicate I/O requests to hypervisor 106 on behalf of containers 116, and, more specifically, on behalf of applications 118 running in containers 116 on VMs 104. An I/O request can involve interaction with virtual disks 124₁ to 124ₐ (collectively referred to as virtual disks 124 and individually referred to as virtual disk 124), container volumes 123₁ to 123ᵦ (collectively referred to as container volumes 123 and individually referred to as container volume 123), and disk file 126₁ to 126ᵧ (collectively referred to as disk files 126 and individually referred to as disk file 126). For example, an I/O request can be issued by an application 118 running in a container 116 on VM 104 to a container volume 123, which in this example is at least a portion of a virtual disk 124, backed by a virtual disk file 126 stored in storage 128. In certain embodiments, virtual disk 124 is a container volume 123. This I/O request may be intercepted by container agent 122, and container agent 122 can forward this request to hypervisor 106 such that the request can be serviced.

In certain embodiments, guest OS 112 includes a native file system layer that interfaces with virtual hardware platform 110 to access, from the perspective of each application 118 (and guest OS 112), a data storage host bus adapter (HBA), which in reality, is virtual HBA 130 implemented by virtual hardware platform 110 that provides, to guest OS 112, the functionality of disk storage support to enable execution of guest OS 112 as though guest OS 112 is executing on physical system hardware. In certain embodiments, a virtual disk exposes the same abstraction as a real (physical) disk, that is, a linear list of addressable sectors. However, hypervisor 106 may store images backing the virtual disks 124 as regular disk files shown as storage disk files 126 stored on storage 128. From the perspective of each application 118 (and guest OS 112), file system calls are initiated by each application 118 to implement file-system-related data transfer and control operations (e.g., read, write I/Os), such as to container volume 123 (e.g., associated with virtual disk 124). Such calls are translated by guest OS 112 into disk sector I/O requests that are passed through virtual HBA 130 to hypervisor 106. Hypervisor 106 then translates these requests into file access requests from disk files 126. In the case that storage 128 is a centralized storage system, such as a storage area network (SAN) device or system, the data transfer and control operations can be passed through various layers of hypervisor 106 to true hardware HBAs 132 or network interface cards (NICs) 134 that connect to storage 128 as described in more detail below.

Storage 128 represents persistent storage devices (e.g., one or more hard disks, flash memory modules, solid-state drives (SSDs), and optical disks). Although the example embodiment shown here illustrates storage 128 as local storage in hardware platform 108, in some embodiments, storage 128 is storage externally coupled to host 102. For example, storage 128 can refer to third-party storage or a storage service.

Storage 128 stores one or more disk files 126 corresponding to one or more virtual disks 124, and accordingly one or more container volumes 123, that VMs 104 and containers 116 access. In certain embodiments, a virtual disk 124 is virtual storage for one or more containers 116 that has been manually provisioned (e.g., by an administrator) or dynamically or automatically provisioned. In certain embodiments, each virtual disk 124 backing a container volume 123 is an abstraction (e.g., shown using dashed lines in virtual hardware platform 110) backed by a file, such as a .vmdk or .vhd file or the like, containing a virtual disk image. For example, disk files 126 backing virtual disks 124, respectively, are shown stored in storage 128. In certain embodiments, each disk file 126 has a lifecycle independent of any individual container 116 that uses the virtual disk 124 corresponding to the disk file 126. Accordingly, when all containers 116 associated with a virtual disk 124 (e.g., all containers 116 with a container volume 123 on the virtual disk 124) are removed from host 102 (e.g., all containers 116 are no longer running), the virtual disk file 126 corresponding to the virtual disk 124 can still exist.

One or more configuration files may specify whether virtual disks 124 are to be created for use for container volumes 123 by containers 116. More specifically, the configuration files may contain a special field called "type"

along with other properties of the virtual disks to be created. Where the "type" field value is set to "data," a virtual disk 124 is created.

Hypervisor 106 includes storage layer 138. Storage layer 138 is configured to receive and understand disk block-based I/O requests from guest OS 112, received via virtual HBA 130. Storage layer 138 is configured to manage storage space for VMs 104. In one embodiment, storage layer 138 includes numerous logical layers, such as an I/O virtualization layer 140, a container driver 142, and a disk access layer 144. In some embodiments, I/O virtualization layer 140 of storage layer 138 converts the received disk block-based I/O request into disk block-based I/O operations understood by container volume driver 142. I/O virtualization layer 140 then issues these disk block-based I/O operations to the container driver 142.

Container driver 142, in general, manages the creation, use, and deletion of files (e.g., such as .vmdk files backing virtual disks 124) stored on physical locations of, or in logical volumes or Logical Unit Numbers (LUNs) exposed by, storage 128. Container driver 142 issues these disk block-based I/O operations to a data access layer 144 that applies command queuing and scheduling policies to the operations and ultimately sends the operations to components of physical hardware platform 108, and more specifically, storage 128 to read or write data to blocks stored in disk file 126.

In certain embodiments, VM 104 includes one or more I/O modules 146 (collectively referred to as I/O modules 146 or individually as I/O module 146). I/O modules 146 implement I/O processing functionality, including one or more of encryption, compression, deduplication, formatting, custom processes, or the like. Each I/O module 146 may implement a different I/O processing functionality. In certain embodiments, I/O modules 146 are used in conjunction with one another, such that data corresponding to an I/O request can be processed by multiple I/O modules 146. In certain embodiments, an ordering is defined for the I/O modules 146, such that data is processed by the I/O modules 146 in a particular sequence. For example, the order may specify that data is compressed by a first I/O module 146 and subsequently encrypted by a second I/O module. In certain embodiments, I/O modules 146 are loaded with a container or later on-demand.

Support for execution of one or more I/O modules 146 is provided by the container configuration manager 154 in certain embodiments. During container creation, the container configuration manager 154, alone or in conjunction with container management module 120, issues an I/O request for configuration information. In one or more aspects, the configuration information is stored in storage 128. In certain embodiments, the configuration information may be isolated from data generated by application 118 within container 116, as it is not stored in any disk files 126. In certain embodiments, the configuration information can be acquired from configuration file 158 and module configuration file 160. In an example, container configuration file 158 and module configuration file 160 can be retrieved by the container configuration manager 154 from storage 128 through traditional I/O channels. The container configuration manager 154 uses configuration information from the container configuration file 158 to configure a container 116. The container manager 154 also utilizes configuration information from the module configuration file 160 to configure one or more I/O modules 146 associated with a container 116 and, more specifically, the container volume 123. The container configuration manager 154 also utilizes configuration information to populate or trigger population of one or more tables or other data structures such as the module table 148, container table 150, and volume table 152.

Container configuration file 158 stores the configuration for each container with associated container volume information (e.g., name, size). For example, container configuration file 158 can be specified as shown below. For each container 116, the container's name is specified along with one or more container volumes 123, including volume name and size.

```
{
    container-1 {
        name : <container name>
        volume-1 {
            name : <volume name>
            size : <volume size>
        }
        volume-2 {
            name : <volume name>
            size : <volume size>
        }
    }
}
```

Module configuration file 160 stores configuration information for each I/O module 146. The configuration information for an I/O module 146 can include a name or identifier for the module, a container volume name that the module is linked to, module file location where the I/O module is stored, module loading command (e.g., to load the executable of the module in memory from the location), module input command (e.g., to feed the I/O data), module output command (e.g., to retrieve I/O data after additional processing), and/or a specified order of modules. In certain embodiments, the specified order can correspond to a position of an I/O module 146 within a stack of I/O modules 146, which is an ordered collection of I/O modules 146 in which position is represented with ascending numbers starting at the top of the stack, the first module in order starting at the top of the stack and the last module in order at the bottom of the stack. In one example embodiment, the module configuration file 160 is formatted as follows:

```
{
Module-1 {
    name : <module name>
    volume name : <volume name>
    location : <module processing logic location>
    cmds {
    Module loading command : < ...>
    Module input command : <...>
    Module output command : <...>
    }
}
Module-2 {
    name : <module name>
    volume name : <volume name>
    location : <module processing logic location>
    cmds {
    Module loading command : < ...>
    Module input command : <...>
    Module output command : <...>
    }
}
```

In certain embodiments, container agent 122 is configured to invoke one or more I/O modules 146 to perform the functionality captured thereby. In certain embodiments, container agent 122 includes module table 148. Module table 148 includes, for each of one or more I/O modules 146, information regarding a mapping between an identifier of the I/O module 146 (referred to as an I/O module identifier or moduleID), optionally, a position of the I/O module 146 in a defined ordering of I/O modules 146, an identifier of an interface (e.g., a message queue for commands) of the I/O module 146, or a combination thereof. For example, module table 148 may include a number of entries (e.g., rows), such as one for each of the one or more I/O modules 146. Though certain embodiments are described with respect to module table 148, other suitable data structures may be used for storing the mapping information.

In certain embodiments, container agent 122 is configured to call an I/O module 146's interface to input data to the I/O module 146 or receive output data from the I/O module 146. Further, in certain embodiments, container agent 122 is configured to coordinate data processing by I/O modules 146 according to a defined order. In certain embodiments, after the data is processed by the last I/O module 146 in the defined order, container agent 122 outputs the transformed data to container driver 142 of hypervisor 106 to save to storage 128 for a write request, or container agent 122 outputs the transformed data to container 116 for a read request.

In certain aspects, container driver 142 is responsible for maintaining metadata to capture a mapping of container 116 to its volumes 123 and the set of one or more I/O modules 146. Further, container driver 142 is configured to invoke container agent 122 through uplink calls (e.g., reverse calls from hypervisor 106 to VM 104) if it determines there are I/O modules 146 associated with the container volume 123 and that the I/O should be passed through the I/O modules 146 to fulfill an I/O request. In certain embodiments, container driver 142 includes container table 150 and volume table 152.

Container table 150 stores a mapping of one or more containers to one or more container volumes by storing one or more entries, each entry mapping a container identifier (e.g., containerID) to a container volume identifier (e.g., volumeID). In certain embodiments, each entry of container table 150 further maps the container identifier and volume identifier to a number of I/O modules 146 (e.g., Nm) associated with the container volume identifier. Table entries can be in the following format: "<containerID, volumeID, Nm>." "ContainerID" is a unique identifier of the container used as a key for lookup, "volume ID" is a unique identifier for a volume, and "Nm" is the number of I/O modules 146 associated with the "volumeID."

Volume table 152 stores a mapping of container volumes to lists of associated I/O modules 146. In particular, the volume table 152 includes one or more entries, each entry mapping volumeID of a container volume to a list of associated identifiers of I/O modules 146 (e.g., m1, m2, m3, . . . , mn) and position order of each of the I/O modules 146 (e.g., p1, p2, p3, . . . , pn). The list can be maintained in sorted order of positions. An example table entry format is the following: "<volumeID, {(m1, p1), (m2, p2), (m3, p3), . . . , (mn, pn)}>." Consequently, in a stack-based ordering by position, "m1" can be the top module of the stack, and "mn" can be the bottom module in the stack. "VolumeID" is a unique identifier for a volume used as a key to lookup, and "{m1, m2, m3, . . . mn}" is a list of unique identifiers for I/O modules 146 associated with the "volumeID." Though certain aspects are discussed with respect to stack-based ordering and accordingly refer to stack position, the techniques herein can be used with any type of ordering and accordingly the reference to stack position can refer to any suitable positioning for such different types of ordering.

Hardware platform 108 of each host 102 includes components of a computing device, such as one or more processors (central processing units (CPUs)) 164, memory 162, a network interface card including one or more network adapters, also referred to as NICs 134, storage 128, HBA 132, and other I/O devices such as, for example, a mouse and keyboard (not shown). CPU 164 is configured to execute instructions, for example, executable instructions that perform one or more operations described herein and that may be stored in memory 162 and in storage 128. NIC 134 enables host 102 to communicate via a communication medium with other devices. HBA 132 couples host 102 to one or more external storages (not shown), such as a storage area network (SAN).

Figure 2:
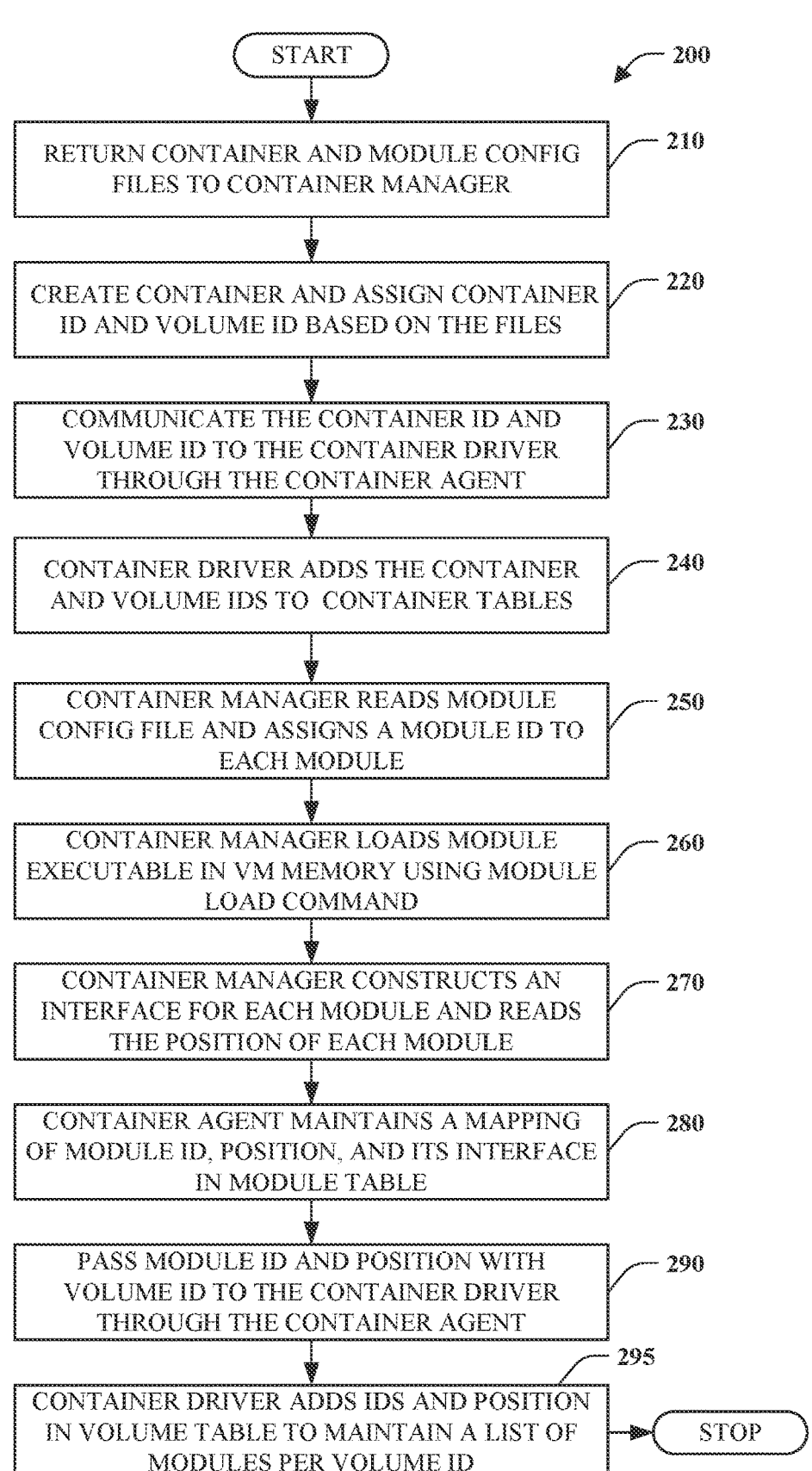
FIG. 2 is a flow chart diagram depicting an example method of creating a container and adding an I/O module to a virtual machine.

Turning attention to FIG. 2, a method/process for creating a container 116 and adding an I/O module 146 to a VM 104 is depicted. At 210, the container configuration manager 154 initiates a read I/O request for the container configuration file 158 and the module configuration file 160 from storage 128. In response to the I/O request, the container configuration manager 154 is provided the container configuration file 158 and the module configuration file 160 from storage 128. At 220, the container configuration manager 154 creates container 116 based on the container configuration file 158. As part of the creation process, in accordance with one aspect, the created container 116 is assigned a container identifier. Further, one or more container volumes may be created for container 116, such as container volumes identified in container configuration file 158, and may be assigned one or more container volume identifiers. The container identifier of the created container 116 is further associated with one or more container volume identifiers assigned to one or more container volumes 123 associated with the created container 116 in the configuration file 158. At 230, configuration manager 154 communicates the container identifier of the created container 116 and the volume identifier(s) of the container volumes 123 associated with container 116 to container driver 142 through container agent 122. After receipt, at 240, the container driver 142 adds the container identifier and volume identifier to container table 150, for example, as a row in container table 150. At 250, the container configuration manager 154 reads the module configuration file 160 and assigns an I/O module identifier (e.g., moduleID) to each of the I/O modules specified in module configuration file 160. At 260, the container configuration manager 154 initiates loading each executable I/O module 146 into the virtual machine's memory using a load command for the I/O module 146 (e.g., application programming interface (API)). At 270, container configuration manager 154 constructs an interface for each I/O module to enable operations to be performed using a module input command and a module output command. The interface is an entry point for operations and can be considered a message queue for communicating with an I/O module. Further, in certain embodiments, the container configuration manager 154 reads stack position, or, more generally, a specified ordering, of I/O modules from the module configuration file 160. At numeral 280, the container configuration manager 154 communicates one or more I/O module identifiers, ordering (e.g., stack position) of each I/O module, and an interface for each I/O module to container agent 122. The container agent 122 is configured to write such information to module table 148. In certain embodiments, the module table 148 is associated with a single container volume 123, and the format of each row in the table is "<module ID, position, interface>. At 290, container agent 122 communicates I/O module identifier, position, and volume identifier for each I/O module 146 in module table 148 to container driver 142. The container driver 142 adds this information to the volume table 152. In certain embodiments, the container driver 142 adds each I/O module 146 to a list of I/O modules and positions for a given container volume or, more specifically, volume identifier. Further, in certain aspects, container driver 142 maintains the list in sorted order of stack position or order.

Figure 3:
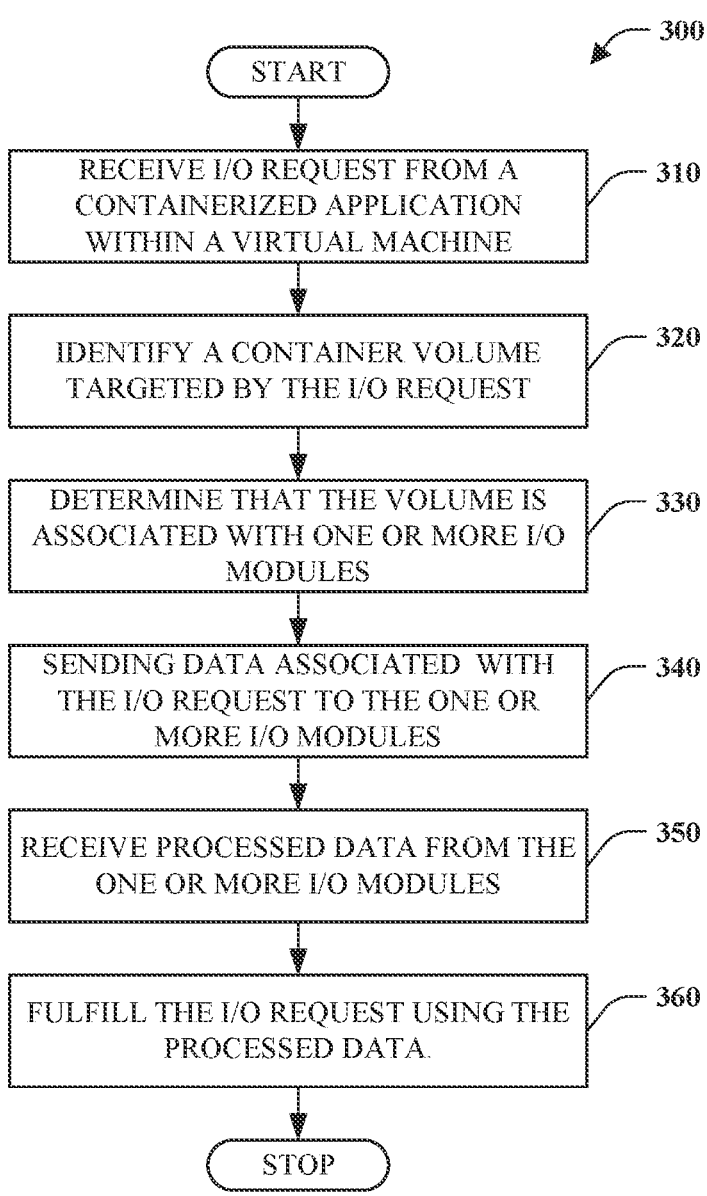
FIG. 3 is a flow chart diagram of a high-level example input/output processing method.

FIG. 3 is a flow chart diagram of a high-level example I/O processing method or process utilizing I/O modules. At 310, an I/O request (e.g., read, write) is received from a containerized application 118 within VM 104. At 320, the container volume 123 targeted by the request is identified from the I/O request.

At 330, a determination is made that container volume 123 is associated with one or more I/O modules 146. The determination is made by container agent 122 or container driver 142. For example, in certain aspects, container agent 122 determines that container volume 123 is associated with one or more I/O modules 146 based on the existence of a module table 148 for container volume 123. Alternatively, in certain aspects, container driver 142 utilizes a container identifier inserted into the request by the container agent 122 to look up a row in the container table 150 for the container and identify an indicator that specifies one or more I/O modules 146 are associated with container 116, such as where each container volume 123 of the container 116 is associated with the same one or more I/O modules 146 due to I/O module association at the container level instead of the container volume level. As another alternative, in certain aspects, container driver 142 determines that container volume 123 is associated with an I/O module by locating an entry for a corresponding container volume identifier in the volume table 152.

At 340, data associated with the I/O request is sent to the one or more I/O modules for processing. For example, container agent 122 looks up an input command for an I/O module 146 in module table 148 associated with the container volume 123 and calls the command with the data to be processed as a parameter.

At 350, processed data is received from the one or more I/O modules 146. In one embodiment, container agent 122 looks up the output command for an I/O module in module table 148 associated with the container volume 123 and subsequently calls the command to receive processed data as output. In certain aspects, where there is more than one I/O module 146, container agent 122 invokes the I/O modules 146 in a specified order. In one embodiment, input and output commands are called for each I/O module 146 in order, such that the input command is called for the first I/O module 146, followed by the output command for the first I/O module 146 and the output of the first I/O module is provided in an input command to a second I/O module 146, and so on. In an alternative embodiment, an input command is called for a first I/O module 146. The output of the first I/O module is automatically passed to the second I/O module 146 to cascade data through the modules, and an output command is called on the last I/O module in the order to receive the processed data.

At 360, the I/O request is fulfilled using the processed data. In a write request, the processed data is saved to storage 128. For example, data can be encrypted by an I/O module and subsequently saved to storage 128. In a read request, data retrieved from storage 128 is processed and communicated to the containerized application 118. For example, the encrypted data can be retrieved from storage 128 and decrypted before sending the data to the containerized application 118.

Figure 4:
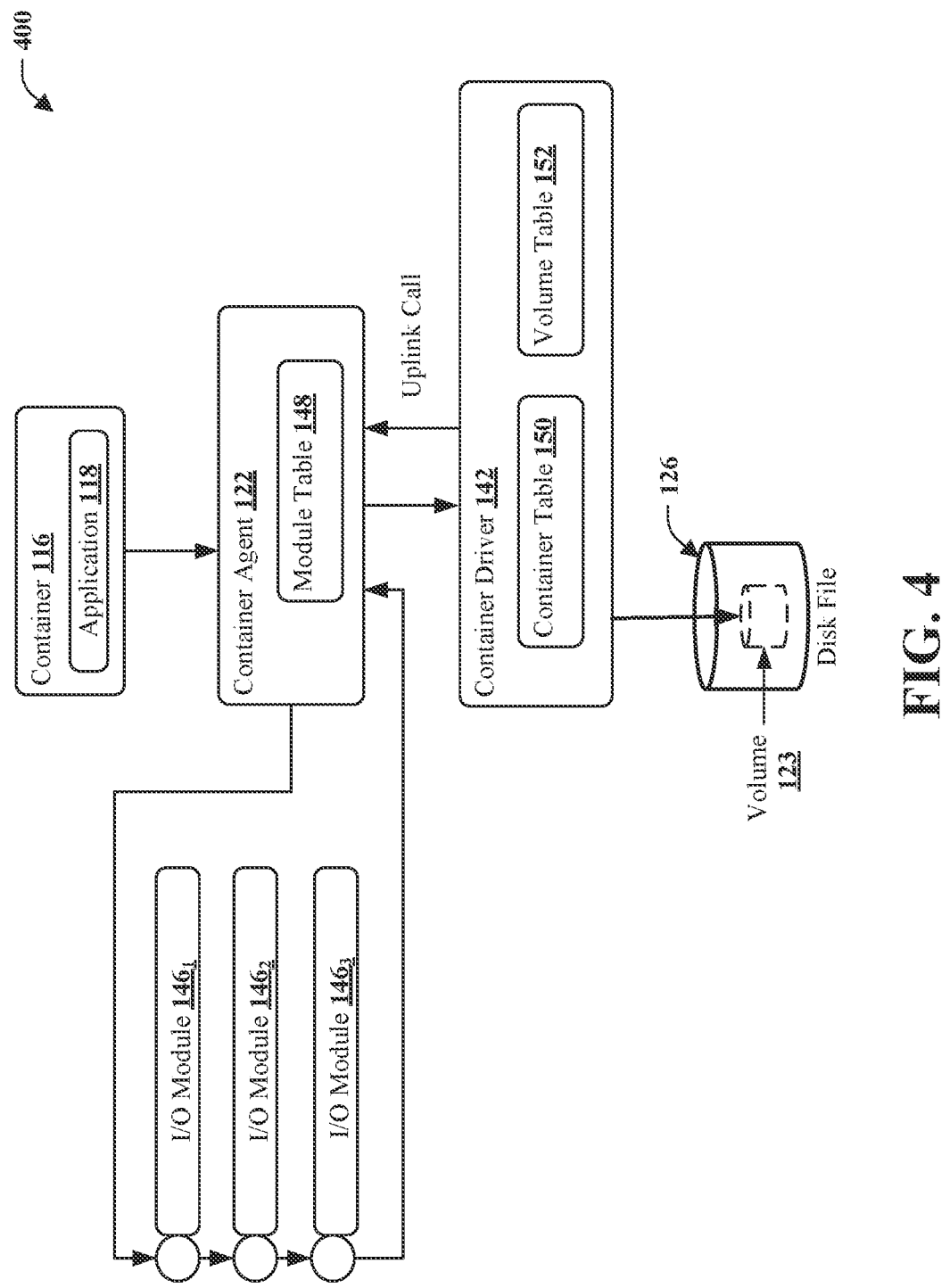
FIG. 4 depicts an example write I/O system in further detail.

FIG. 4 depicts an example write I/O system 400 in further detail and isolated from other virtualization and hardware components in FIG. 1 to facilitate clarity and understanding. Illustrated are container 116 including application 118, which is communicatively coupled to container agent 122 and includes module table 148. The container agent 122 is communicatively coupled to the container driver 142 including container table 150 and volume table 152. Further, container driver 142 is communicatively coupled to the disk file 126, which includes a target container volume 123 associated with a virtual disk 124. Further depicted are three I/O modules 146, namely I/O module 146₁, I/O module 146₂, and I/O module 146₃. The I/O modules 146 are illustrated in stack positions or orderings. Here, I/O module 146₁ is executed first, followed by I/O module 146₂, and then 146₃. The circles illustrated next to the I/O modules 146 correspond to respective interfaces.

Figure 5A:
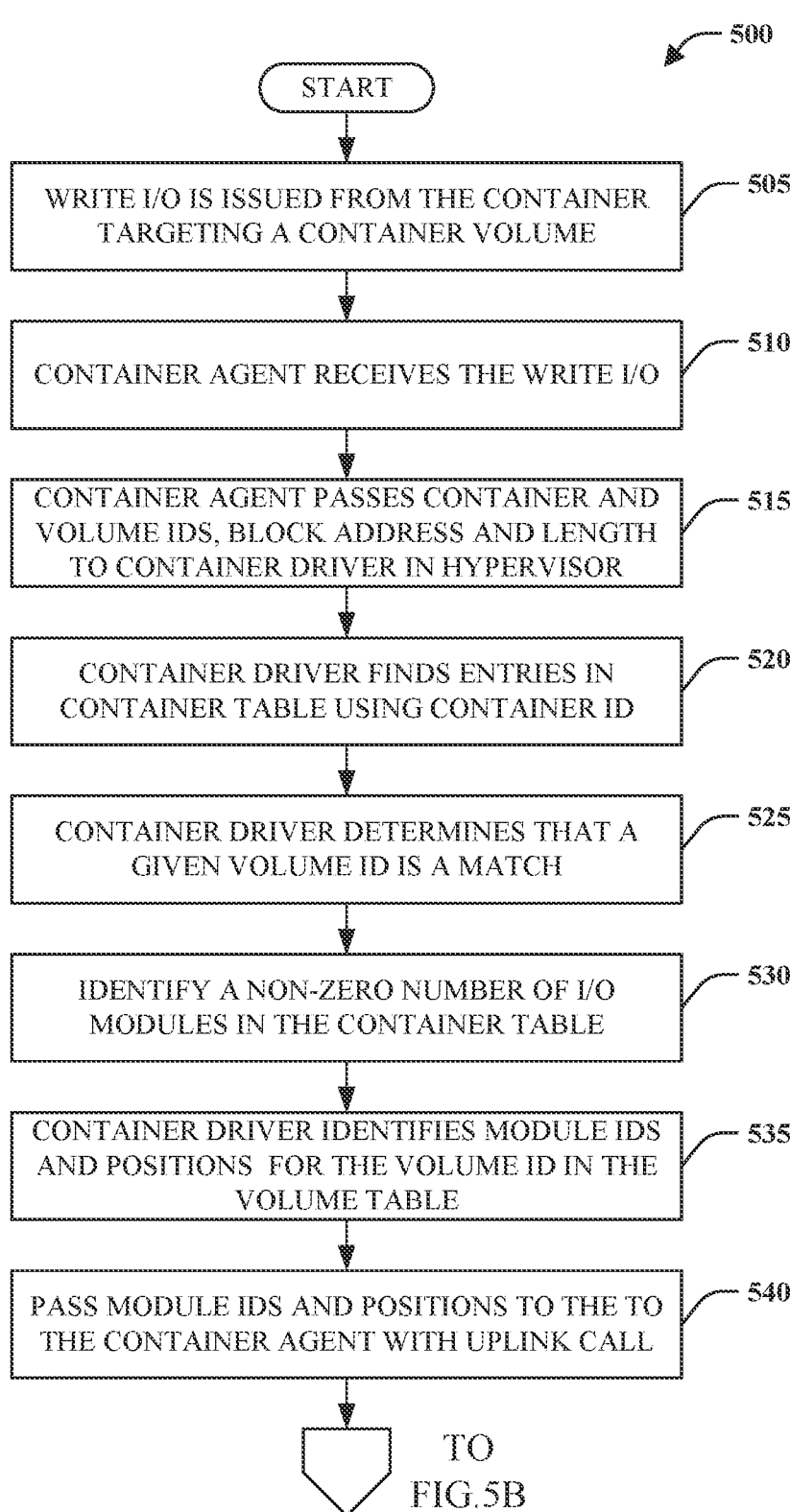

Turning attention to FIGS. 5A-B, an example write I/O method 500 is depicted with respect to the system 400 of FIG. 4. At 505, write I/O, or a write request, is issued from container 116 targeting a container volume 123. More specifically, the write request is issued by application 118 running in container 116. At 510, container agent 122 receives the write request, for example, by intercepting the request. In one embodiment, the write request includes a container identifier, volume identifier, and data. In an alternative embodiment, the write request includes the volume identifier and data, and container agent 122 is configured to add the container identifier of the container associated with the request. At 515, container agent 122 passes the container identifier, volume identifier, and data to container driver 142. Container driver 142 looks up entries in container table 150 using the container identifier at 520. At 525, container driver 142 determines that container table 150 includes an entry that associates the volume identifier with the container identifier. The association is a security check to ensure the write request to container volume 123 is from container 116 with permission to write to container volume 123. In addition to the volume identifier, container table 150 is configured to include a number (e.g., Nm) of I/O modules associated with the volume identifier in certain aspects. At numeral 530, the container driver 142 identifies a non-zero number of I/O modules from an entry in the container table associated with the container identifier and volume identifier. At 535, container driver 142 retrieves one or more I/O module identifiers associated with the volume identifier and, in some cases, an order of the one or more I/O module identifiers, corresponding to an order of the corresponding I/O modules, from the volume table 152. Container driver 142 is configured to locate the one or more I/O module identifiers and, in some cases, order in volume table 152 using the volume identifier as a key to locate a row with a list of I/O module identifiers and orderings. At numeral 540, container driver 142 passes the one or more I/O module identifiers and, in some cases, order with the data in the write request to container agent 122 with an uplink call from a hypervisor to a virtual machine. At 545, container agent 122 finds interfaces for I/O modules 146 in module table 148 based on the I/O module identifiers. An interface can correspond to a message queue associated with an I/O module 146 to enable communication with the I/O modules, including issuing commands. Container agent 122, at 550, fetches commands (e.g., input or output) for each module from a module configuration file (not shown). At 555, container agent 122 identifies the first I/O module based on the associated order or if there is only one I/O module, identifies the one I/O module. At 560, container agent 122 calls the first I/O module with an input command that passes the data to the I/O module 146. The container agent 122 subsequently calls the I/O module using an output command to retrieve processed data at 565. At 570, container agent 122 determines whether there are additional I/O modules for processing. In other words, the determination concerns whether or not additional I/O modules are associated with a container volume that have not been applied to the data. If there are additional I/O modules ("YES"), the method continues at 575. The next I/O module in a specified order is identified at 575, and the process returns to 560, wherein the identified I/O module is called with the input command. If there are no additional I/O modules ("NO"), the processed data from the last module is given to the container agent 122 that transfers the processed data to the container driver 142 to write to the container volume 123 at 580. For example, the container driver 142 can call a hypervisor file system layer to save the processed data in container volume 123 on disk file 126.

Figure 6:
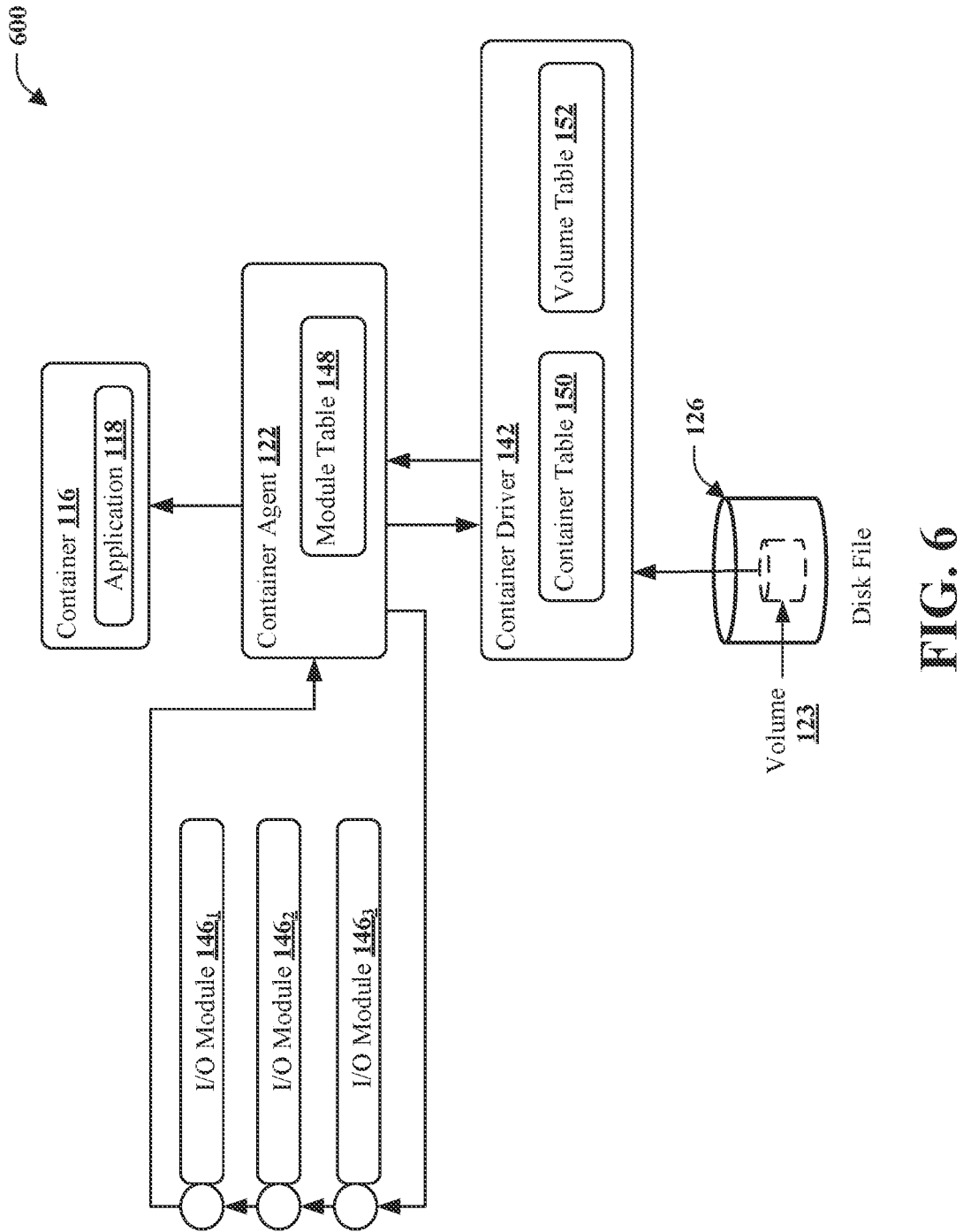
FIG. 6 depicts an example read I/O system in further detail.

FIG. 6 depicts an additional example read I/O system 600 in further detail and isolated from other virtualization and hardware components in FIG. 1 to facilitate clarity and understanding. Similar to FIGS. 1 and 4, system 600 depicts container 116, including application 118, container agent 122, including module table 148, container driver 142, including container table 150 and volume table 152, disk file 126, and volume 123. Further, system 600 includes I/O module 146₁, I/O module 146₂, and I/O module 146₃, like system 400. Here, however, the process flow associated with I/O module execution is substantially reversed as compared to a write I/O module execution as data is retrieved from the container volume 123 on the disk file 126 and processed in reverse order (e.g., from the bottom to the top of the stack) as compared to the order for the processing of data for a write I/O (e.g., from top to bottom of the stack.). In this manner, if during a write operation, data is formatted, compressed, and encrypted, during the read operation of that data, it can be decrypted, decompressed, and unformatted in that sequence. However, it is also to be appreciated that the example write I/O system 400 can be employed first for a read request to ensure that that data is being read from the correct location, as described further below.

Figure 7A:
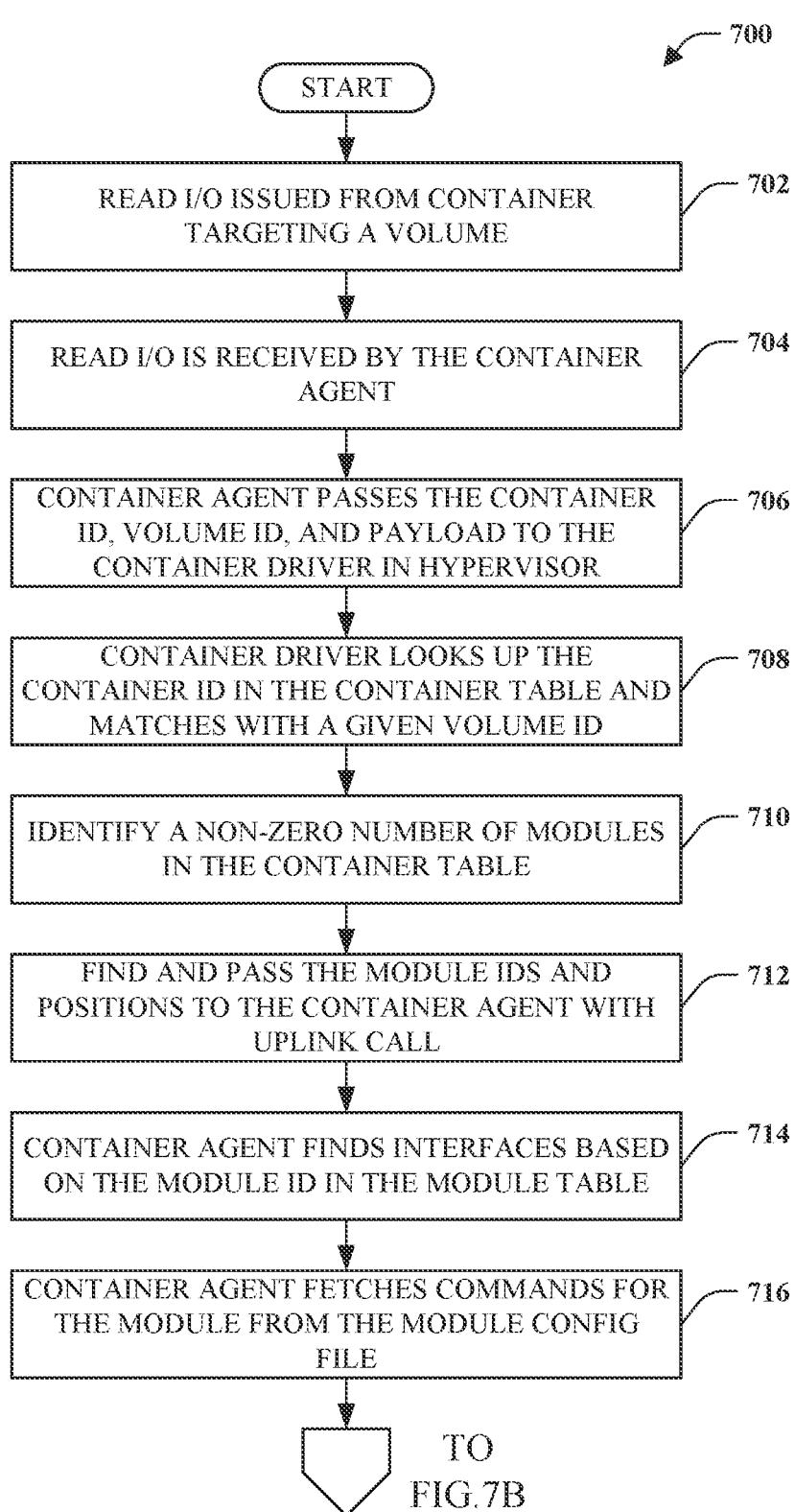
FIGS. 7A-C depict a flow chart diagram of an example read I/O method.
Figure 7B:
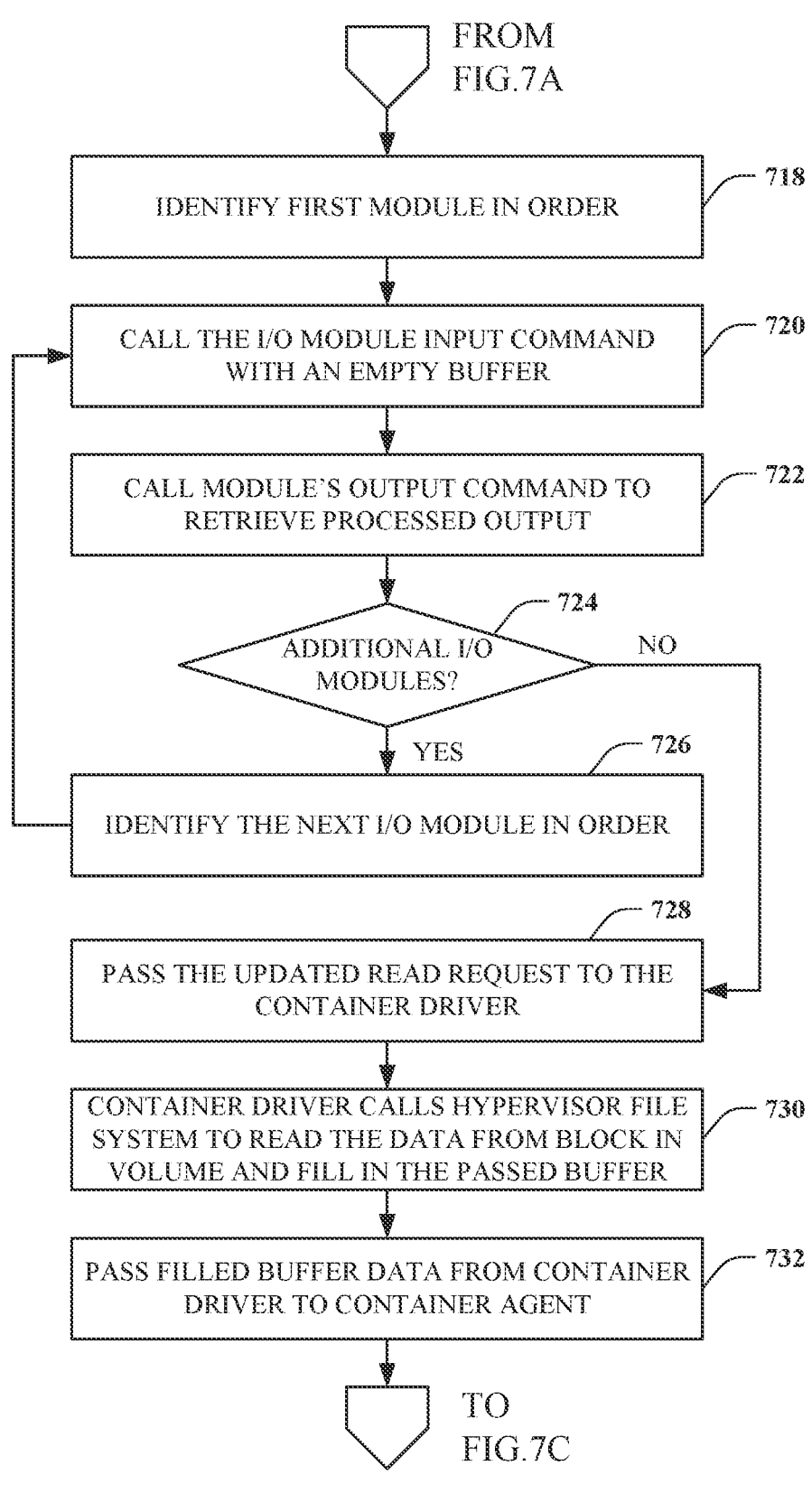
Figure 7C:
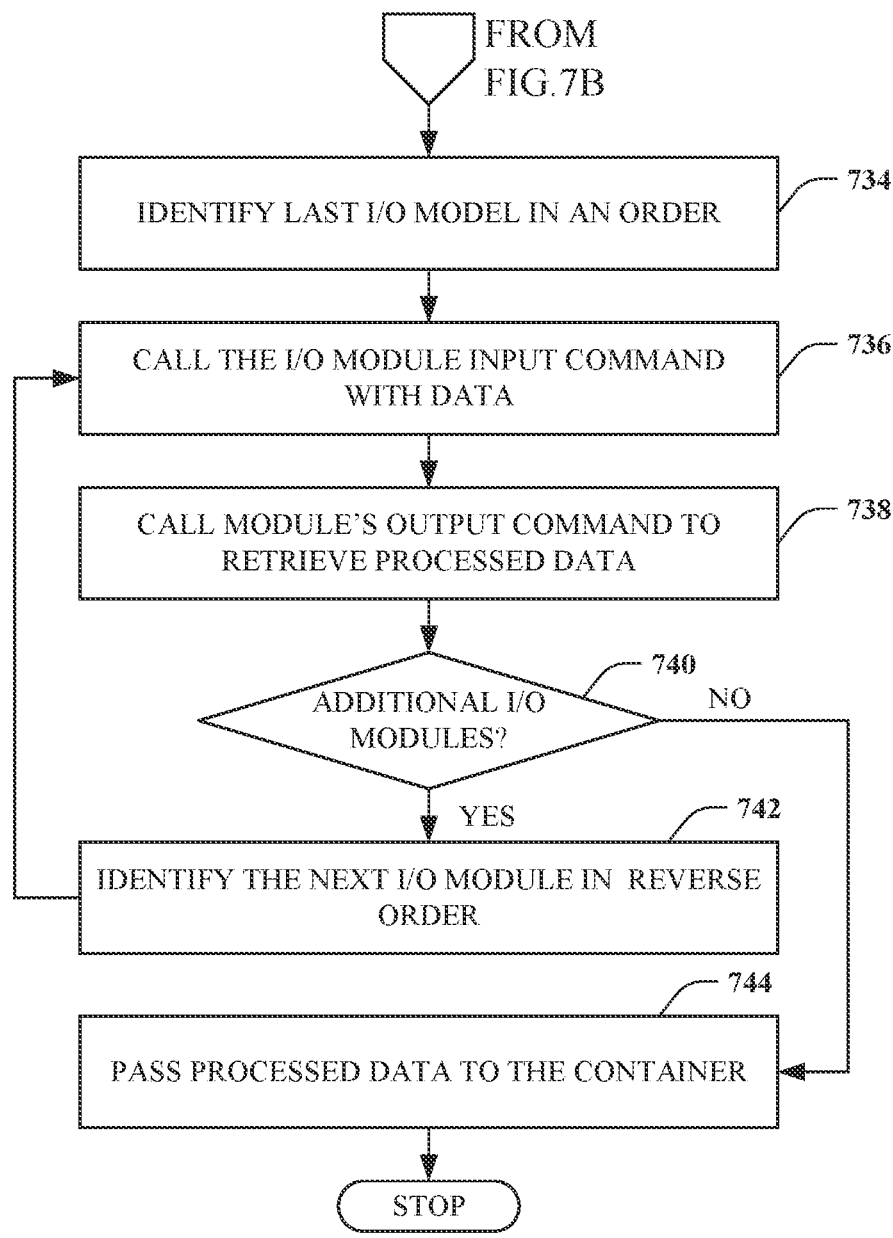

Turning attention to FIGS. 7A-C, an example read I/O method or process 700 is depicted with respect to system 400 of FIG. 4 and system 600 of FIG. 6. At 702, a read I/O, or read request, is issued from container 116 comprising application 118. In certain aspects, container 116 captures a read request from application 118 and reissues the request itself. A container agent 122 receives, for example, by message interception, the read request at 704. In certain aspects, the read request includes an empty buffer (e.g., pointer to a memory location) to fill with acquired data. In certain aspects, the read request can include a volume identifier, block address, and data length. In other aspects, the container identifier is received with the request or added by container agent 122 after receipt of the read request. At 706, container agent 122 passes container and volume identifiers, block address, and length to container driver 142. At 708, container driver 142 locates entries in the container table using the container identifier. In certain embodiments, container driver 142 is configured to provide enhanced security by determining a match between the given volume identifier in the read request and the volume identifier associated with the container in container table 150. If there is not a match, the read request can be dropped from further processing to prevent unauthorized reading of a volume. Otherwise, processing continues at 710, where container driver 142 identifies a non-zero number of I/O modules 146 associated with the volume identifier from an entry in container table 150. At 712, container driver 142 finds one or more I/O module identifiers and, in some cases, position/order of the one or more I/O modules for the volume identifier in the volume table 152 and passes one or more I/O module identifiers and, in some cases, order to container agent 122 through an uplink call. Based on the one or more I/O module identifiers, container agent 122 locates one or more interfaces (e.g., messaging queues for receiving commands) for the one or more I/O modules from module table 148 at 714. At 716, container agent 122 fetches commands for each module from a module configuration file.

At 718, the first I/O module is identified by container agent 122, in some cases in the order acquired from the volume table. For example, the order can be specified numerically as "1," "2," and "3," in which "1" is first, "2" is second, and "3" is third in terms of processing order. If there is a single I/O module, a position need not be specified as the container agent 122 can be configured to understand that the single I/O module is the first I/O module. At 720, a call to the I/O module's input command is made. The input command feeds I/O request data to an I/O module for processing. Since data has not yet been retrieved for a read request, a pointer to an empty buffer can be fed to the I/O modules. At 722, the I/O module's output command is called, which returns processed output.

In certain aspects, the output can change a read request header, such as by adjusting a parameter to direct the request to a correct block address that the I/O module logic may have modified. For example, consider an I/O module that performs data deduplication logic, which eliminates redundant data by retaining one data instance and replacing other data instances with a pointer to the retained data instance. Data deduplication can change the size of the storage space allocated to the data and the location of elements within the space. Generally, a mapping can be performed by the I/O module logic that can be determined by executing the I/O module to update a read request to reflect the mapping.

In this manner, read and write requests follow a similar procedure such that the read request can locate the data saved with the write request. At 724, container agent 122 determines whether or not there are additional I/O modules. If there are additional I/O modules ("YES"), the process continues at 726. At 726, the next I/O module in an order is identified, and the process loops back to 720, where an input command for the next I/O module is called with the output from a prior I/O module. If there are no additional I/O modules ("NO"), the read request, as updated by I/O modules, is passed by the container agent 122 to the container driver 142 at 728. At 730, the container driver calls the hypervisor file system to read data from the block in the volume and fill the buffer with the data. At 732, a pointer to the buffer with the data is passed from container driver 142 to container agent 122 via an uplink call. In certain aspects, the read request, including a pointer to a filled buffer, is passed to the container agent 122.

At 734, container agent 122 identifies the last I/O module from order information. If there is a single I/O module associated with the container volume, container agent 122 identifies the single I/O module as the last I/O module. At 736, container agent 122 calls the input command for the identified I/O module with the data in the buffer. At 738, the output command is called for the identified I/O module to receive processed data. At 740, a determination is made by the container agent as to whether or not there are additional I/O modules that have not yet been executed. If there are additional I/O modules ("YES"), the next I/O module is identified in reverse order (e.g., last, next to last) at 742. The process then loops back to 736, where an I/O module's input command is called. Further, the input command is called with the output data of a prior I/O module. If there are no additional I/O modules ("NO"), container agent 122 passes processed data produced by execution of one or more I/O modules to container 116 (and application 118 via container 116) at 744. In certain aspects, the processed data from the first I/O module can be provided to container 116 as it is the final module processed in reverse order starting from the last module in the order.

The conjunction "or" as used in this description and appended claims is intended to mean an inclusive "or" rather than an exclusive "or," unless otherwise specified or clear from the context. In other words, "'X' or 'Y'" is intended to mean any inclusive permutations of "X" and "Y." For example, if "'A' employs 'X,'" "'A' employs 'Y,'" or "'A' employs both 'X' and 'Y,'" then "'A' employs 'X' or 'Y'" is satisfied under any of the preceding instances.

Furthermore, to the extent that the terms "includes," "contains," "has," "having," or variations in form thereof are used in either the detailed description or the claims, such terms are intended to be inclusive in a manner similar to the term "comprising" as "comprising" is interpreted when employed as a transitional word in a claim.

The various embodiments described herein may employ various computer-implemented operations involving data stored in computer systems. For example, these operations may require physical manipulation of physical quantities— usually, though not necessarily, these quantities may take the form of electrical or magnetic signals, where they or representations of them are capable of being stored, transferred, combined, compared, or otherwise manipulated. Further, such manipulations are often referred to as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general-purpose computer selectively activated or configured by a computer program stored in the computer. In particular, various general-purpose machines may be used with computer programs written in accordance with the teachings herein, or it may be more convenient to construct a more specialized apparatus to perform the required operations.

The various embodiments described herein may be practiced with other computer system configurations, including hand-held devices, microprocessor systems, microprocessor-based or programmable consumer electronics, minicomputers, mainframe computers, and the like.

One or more embodiments of the subject invention may be implemented as one or more computer programs or as one or more computer program modules embodied in one or more computer-readable media. The term computer-readable medium refers to any data storage device that can store data that can thereafter be input to a computer system-computer readable media may be based on any existing or subsequently developed technology for embodying computer programs in a manner that enables them to be read by a computer. Examples of a computer-readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer-readable medium can also be distributed over a network-coupled computer system so that the computer-readable code is stored and executed in a distributed fashion.

Although one or more embodiments of the subject disclosure have been described in some detail for clarity of understanding, it will be apparent that certain changes and modifications may be made within the scope of the claims. Accordingly, the described embodiments are to be considered illustrative and not restrictive, and the scope of the claims is not limited to details given herein but may be modified within the scope and equivalents of the claims. In the claims, elements or steps do not imply any particular order of operation unless explicitly stated in the claims.

In accordance with the various embodiments, virtualization systems may be implemented as hosted embodiments, non-hosted embodiments, or embodiments that tend to blur distinctions between the two, which are all envisioned. Furthermore, various virtualization operations may be wholly or partially implemented in hardware. For example, a hardware implementation may employ a lookup table to modify storage access requests to secure non-disk data.

Certain embodiments, as described above, involve a hardware abstraction layer on top of a host computer. The hardware abstraction layer allows multiple contexts to share the hardware resource. In one embodiment, these contexts are isolated, each having at least one user application running therein. The hardware abstraction layer thus provides benefits of resource isolation and allocation among the contexts. In the preceding embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers, each including an application and its dependencies. Each OS-less container runs as an isolated process in user space on the host operating system and shares the kernel with other containers. The OS-less container relies on the kernel's functionality to make use of resource isolation (e.g., CPU, memory, block I/O, network) and separate namespaces and to isolate the application's view of the operating environments completely. Using OS-less containers allows resources to be isolated, services restricted, and processes provisioned to have a private view of the operating system with their own process ID space, file system structure, and network interfaces. Multiple containers can share the same kernel, but each container can be constrained to only use a defined amount of resources such as CPU, memory, and I/O. The term "virtualized computing instance," as used herein, is meant to encompass both VMs and OS-less containers.

Many variations, modifications, additions, and improvements are possible, regardless of the degree of virtualization. The virtualization software can therefore include components of a host, console, or guest operating system that performs virtualization functions. Plural instances may be provided for components, operations, or structures described herein as a single instance. Boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A method, comprising:
   executing, on a hardware platform of a host, a hypervisor that abstracts physical resources of the host into one or more virtual machines;
   running, in a virtual machine (VM), a container engine that manages one or more containerized applications;
   receiving, at a container agent running in the VM, an input/output (I/O) request from a containerized application, wherein the container agent comprises a module table comprising, for a plurality of I/O modules, a mapping between each I/O module and a respective interface for the I/O module;
   identifying a container volume targeted by the I/O request;
   determining, by a container driver running as part of the hypervisor, that the container volume is associated with one or more I/O modules based on a stored mapping of container volumes to I/O modules;
   communicating, by the container driver, identities of the one or more I/O modules to the container agent;
   identifying, by the container agent, one or more interfaces mapped to one or more I/O modules;
   calling, by the container agent, the one or more interfaces to send data associated with the I/O request to the one or more I/O modules for processing;
   receiving processed data from the one or more I/O modules; and
   fulfilling the I/O request using the processed data.

2. The method of claim 1, wherein fulfilling the I/O request using the processed data comprises writing the processed data to the container volume, wherein the I/O request is a write I/O request.

3. The method of claim 1, wherein fulfilling the I/O request using the processed data comprises returning the processed data to the containerized application, wherein the I/O request is a read I/O request.

4. The method of claim 1, wherein determining that the container volume is associated with one or more I/O modules comprises determining the container volume is associated with two or more I/O modules and a specified order of the two or more I/O modules from the stored mapping.

5. The method of claim 4, wherein sending the data associated with the I/O request to the one or more modules for processing comprises sending the data associated with the I/O request to the two or more I/O modules for processing in the specified order.

6. The method of claim 1, wherein communicating identities of the one or more I/O modules comprises sending an uplink call to the container agent including the identities of the one or more I/O modules.

7. The method of claim 1, further comprising:
   sending the I/O request without data to two or more I/O modules for processing in a first order, wherein the processing updates a header of the I/O request to direct the I/O request to a block address based on processing logic of the two or more I/O modules; and
   retrieving the data from the block address.

8. The method of claim 7, wherein sending the data associated with the I/O request to the one or more I/O modules for processing comprises sending the data to the two or more I/O modules for processing in a second order, wherein the second order is the first order reversed.

9. The method of claim 1 wherein the one or more I/O modules perform one or more of encryption, compression, or formatting.

10. A system, comprising:
    one or more processors;
    at least one memory coupled to the one or more processors that stores instructions that, when executed by the one or more processors, cause the one or more processors to:
       execute, on a hardware platform of a host, a hypervisor that abstracts physical resources of the host into one or more virtual machines;
       run, in a virtual machine (VM), a container engine that manages one or more containerized applications;
       identify a container volume targeted by a received input/output (I/O) request from a containerized application;
       determine, by the container driver running as part of the hypervisor, that the container volume is associated with one or more I/O modules based on a stored mapping of container volumes to I/O modules;
       communicate, by the container driver, identities of the one or more I/O modules to the container agent;
       identify, by the container agent, one or more interfaces mapped to one or more I/O modules;
       call, by the container agent, the one or more interfaces to send data associated with the I/O request to the one or more I/O modules for processing; and
       fulfill the I/O request using processed data received from the one or more I/O modules.

11. The system of claim 10, wherein the instructions further cause the one or more processors to write the processed data to a virtual disk file for the container volume to fulfill the I/O request, wherein the I/O request is a read I/O request.

12. The system of claim 10, wherein the instructions further cause the one or more processors to return the processed data to the containerized application to fulfill the I/O request, wherein the I/O request is a read I/O request.

13. The system of claim 10, wherein the instructions that cause the one or more processors to determine that the container volume is associated with one or more I/O modules cause the one or more processors to determine the container volume is associated with two or more I/O modules and an order of the two or more I/O modules from the stored mapping.

14. The system of claim 13, wherein the instructions that cause the one or more processors to send the data associated with the I/O request to the one or more modules for processing cause the one or more processors to send the data associated with the I/O request to the two or more I/O modules for processing in the order.

15. The system of claim 10, wherein communicating identities of the one or more I/O modules comprises sending an uplink call to the container agent including the one or more I/O modules.

16. A non-transitory computer-readable medium comprising instructions that, when executed by one or more processors of a computing system, cause the computing system to perform operations, the operations comprising:

executing, on a hardware platform of a host, a hypervisor that abstracts physical resources of the host into one or more virtual machines;

running, in a virtual machine (VM), a container engine that manages one or more containerized applications;

receiving, at a container agent running in the VM, an input/output (I/O) request from a containerized application, wherein the container agent comprises a module table comprising, for a plurality of I/O modules, a mapping between each I/O module and a respective interface for the I/O module;

identifying a container volume targeted by the I/O request;

determining, by the container driver running as part of the hypervisor, that the container volume is associated with one or more I/O modules based on a stored mapping of container volumes to I/O modules;

communicating, by the container driver, identities of the one or more I/O modules to the container agent;

identifying, by the container agent, one or more interfaces mapped to one or more I/O modules;

calling, by the container agent, the one or more interfaces to send data associated with the I/O request to the one or more I/O modules for processing;

receiving processed data from the one or more I/O modules; and fulfilling the I/O request using the processed data.

17. The non-transitory computer-readable medium of claim 16, wherein fulfilling the I/O request using the processed data received from the one or more I/O modules comprises fulfilling a write I/O request by writing the processed data to a virtual disk file for the container volume.

18. The non-transitory computer-readable medium of claim 16, wherein fulfilling the I/O request using the processed data received from the one or more I/O modules comprises fulfilling a read I/O request by returning the processed data to the containerized application.

19. The non-transitory computer-readable medium of claim 16, wherein determining that the container volume is associated with one or more I/O modules comprises determining the container volume is associated with two or more I/O modules and a specified order of the two or more I/O modules from the stored mapping.

20. The non-transitory computer-readable medium of claim 19, wherein sending the data associated with the I/O request to the one or more modules for processing comprises sending the data associated with the I/O request to the two or more I/O modules for processing in the specified order.

\* \* \* \* \*